(12) United States Patent
Shukla et al.

(10) Patent No.: US 9,542,735 B2
(45) Date of Patent: Jan. 10, 2017

(54) METHOD AND DEVICE TO COMPOSE AN IMAGE BY ELIMINATING ONE OR MORE MOVING OBJECTS

(71) Applicant: Samsung Electronics Co., Ltd., Suwon-si, Gyeonggi-do (KR)

(72) Inventors: Alok Shankarlal Shukla, Bangalore (IN); Pankaj Kumar Bajpai, Bangalore (IN); Kasireddy Viswanatha Reddy, Bangalore (IN); Keyur Ruganathbhai Ranipa, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/694,324

(22) Filed: Apr. 23, 2015

(65) Prior Publication Data
US 2015/0319373 A1   Nov. 5, 2015

(30) Foreign Application Priority Data
May 5, 2014   (IN) .......................... 2242/CHE/2014

(51) Int. Cl.
| | |
|---|---|
| G06T 5/50 | (2006.01) |
| H04N 5/262 | (2006.01) |
| H04N 5/232 | (2006.01) |
| G06T 7/00 | (2006.01) |
| G06T 5/00 | (2006.01) |
| H04N 5/357 | (2011.01) |
| H04N 5/272 | (2006.01) |

(52) U.S. Cl.
CPC ................ *G06T 5/50* (2013.01); *G06T 5/002* (2013.01); *G06T 5/005* (2013.01); *G06T 7/0083* (2013.01); *G06T 7/0097* (2013.01); *H04N 5/232* (2013.01); *H04N 5/23222* (2013.01); *H04N 5/23232* (2013.01); *H04N 5/23254* (2013.01); *H04N 5/23267* (2013.01); *H04N 5/2621* (2013.01); *H04N 5/272* (2013.01); *H04N 5/357* (2013.01); *G06T 2207/10004* (2013.01); *G06T 2207/10016* (2013.01); *G06T 2207/20021* (2013.01); *G06T 2207/20144* (2013.01); *G06T 2207/20221* (2013.01)

(58) Field of Classification Search
CPC .............. H04N 5/2621; H04N 5/23254; G06T 2207/20144; G06T 2207/20148
See application file for complete search history.

(56) References Cited

U.S. PATENT DOCUMENTS

| | | | |
|---|---|---|---|
| 7,702,131 B2 * | 4/2010 | Chinen ................. | G06T 7/0081 348/152 |
| 9,311,550 B2 * | 4/2016 | Sun ....................... | G06K 9/3233 |

(Continued)

*Primary Examiner* — James Hannett
(74) *Attorney, Agent, or Firm* — Jefferson IP Law, LLP

(57) ABSTRACT

A method and a device to compose an image by eliminating one or more moving objects in a scene being captured are provided. The method includes capturing plurality of images, generating a background image with a plurality of stationary objects after aligning the plurality of captured images, selecting a base image from a plurality of the aligned images, wherein the base image is selected based on a highest similarity measure with the background image, identifying the at least one moving object in the base image, and eliminating said identified at least one moving object in the base image to compose said image.

15 Claims, 13 Drawing Sheets

(56) References Cited

U.S. PATENT DOCUMENTS

| | | | |
|---|---|---|---|
| 2006/0171584 A1* | 8/2006 | Sandrew | G06T 7/0036 |
| | | | 382/162 |
| 2006/0222205 A1* | 10/2006 | Porikli | G06K 9/32 |
| | | | 382/103 |
| 2007/0086675 A1* | 4/2007 | Chinen | G06T 7/0081 |
| | | | 382/284 |
| 2011/0200259 A1 | 8/2011 | Lindskog et al. | |
| 2015/0221066 A1* | 8/2015 | Kobayashi | G06T 11/00 |
| | | | 382/284 |
| 2015/0248590 A1* | 9/2015 | Li | G06K 9/3241 |
| | | | 382/103 |

* cited by examiner

METHOD AND DEVICE TO COMPOSE AN IMAGE BY ELIMINATING ONE OR MORE MOVING OBJECTS

CROSS-REFERENCE TO RELATED APPLICATION(S)

This application claims the benefit under 35 U.S.C. §119(a) of an Indian patent application filed on May 5, 2014 in the Indian Intellectual Property Office and assigned Serial number 2242/CHE/2014, the entire disclosure of which is hereby incorporated by reference.

TECHNICAL FIELD

The present disclosure relates to the field of digital image processing. More particularly, the present disclosure relates to composing an image by eliminating one or more moving objects while capturing an image.

BACKGROUND

The advent of modern image capturing devices equipped with cameras in wider economic ranges has made image capturing devices popular in both the commercial as well as the domestic markets. For any photography enthusiast, the presence of impulsive movements, such as sudden movements of objects, any unwanted moving objects in a scene or unpredicted appearances of objects in a scene to be captured is a major obstacle. For example, a hastily moving stranger in the scene or a speeding car can ruin a good shot and can annoy a photographer. Eventually, a captured image may require a retouch on a computer, which is generally performed offline. However, current mobile devices such a mobile phone, a Personal Digital Assistant (PDA) or a tablet are equipped with a cameras and are supported by a computationally efficient processor. This enables instantaneous processing of the captured image by applying various image processing techniques to provide a processed output image. Based on image processing tools applied on the captured image, the processed image is enhanced with features such as noise removal, low illumination noise removal, ghosting effect removal and object removal, which effectively enhance the photography experience of the photographer. Photography features in the image capturing device such as elimination of undesired objects in the captured image to provide an output image free of undesired objects is desirable and is one of the sought after features by a user.

Some existing methods provide techniques to replace a selected region in a selected image with a corresponding region from one of other captured images of a scene. These techniques can be applied to applications, and include moving object removal. However, with existing methods of blending a replaced region with surrounding regions of the selected image lacks a natural blending effect. Thus, the processed image displayed may not provide a great photography experience to the photographer. The existing methods mostly perform identification of the undesired object based on an external selection input signal. Moreover, for automatic detection of the undesired object, the existing methods are restricted to mostly human figures in the captured image.

Therefore, a more effective solution for capturing an image, without a presence of moving objects therein, and for the ability to instantaneously display a natural-looking image to the user, is needed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and device for composing an image by eliminating one or more moving objects identified in a base image selected from a plurality of images captured by an image capturing device.

In accordance with an aspect of the present disclosure, a method to compose an image by eliminating at least one moving object is provided. The method includes capturing a plurality of images, selecting a base image from a plurality of the aligned images, wherein the base image is selected based on a highest similarity measure with the background image, identifying the at least one moving object in the base image, and eliminating the identified at least one moving object in the base image to compose the image.

In accordance with another aspect of the present disclosure, an image capturing device for composing an image by eliminating at least one moving object is provided. The image capturing device includes an integrated circuit including at least one processor, and at least one non-transitory memory having a computer program code within the circuit, wherein the at least one memory and the computer program code with a processing module causes an image capturing module to capture a plurality of images, to generate a background image with a plurality of stationary objects after aligning the plurality of captured images, to select a base image from a plurality of the aligned images, wherein the base image is selected based on a highest similarity measure with the background image, to identify the at least one moving object in the base image, and to eliminate the identified at least one moving object in the base image to compose the image.

In accordance with another aspect of the present disclosure, a computer program product is provided. The computer program product includes computer executable program code recorded on a computer readable non-transitory storage medium. The computer executable program code when executed, causing actions including capturing a plurality of images, generating a background image with a plurality of stationary objects after aligning the plurality of captured images, selecting a base image from a plurality of the aligned images, wherein the base image is selected based on highest similarity measure with the background image, identifying the at least one moving object in the base image and eliminating the identified at least one moving object in the base image to compose the image.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
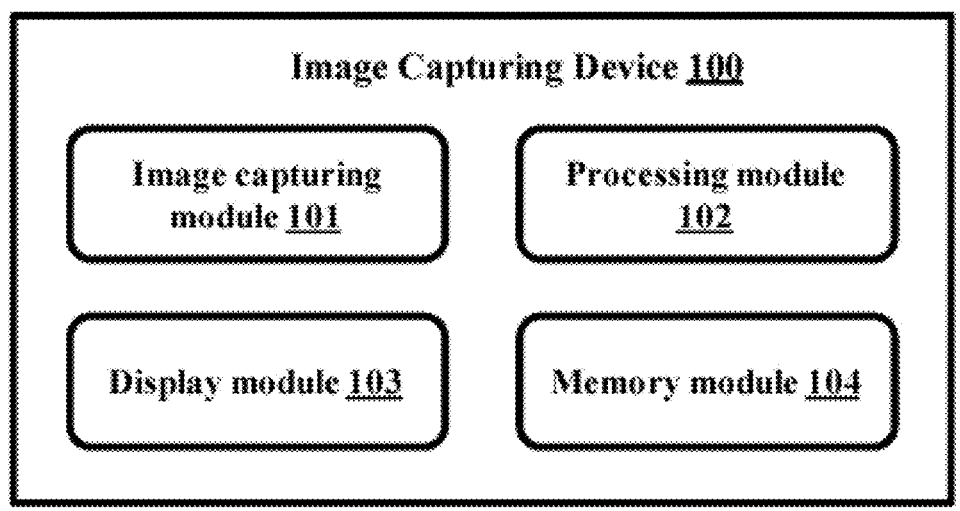
FIG. 1 is an illustration of modules of an image capturing device for composing an image by eliminating one or more moving objects from a base image captured by the image capturing device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIGS. 1 through 9, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged system or device. The various embodiments herein and the various features and advantageous details thereof are explained more fully with reference to the non-limiting embodiments of the present disclosure that are illustrated in the accompanying drawings and detailed in the following description. The examples used herein are intended merely to facilitate an understanding of ways in which the various embodiments herein can be practiced and to further enable those of skill in the art to practice the various embodiments herein. Accordingly, the examples should not be construed as limiting the scope of the various embodiments herein.

Prior to describing the various embodiments of the present disclosure in detail, it is useful to provide definitions for key terms and concepts used herein. Unless defined otherwise, all technical and scientific terms used herein have the same meaning as commonly understood by a personal having ordinary skill in the art to which the present disclosure belongs.

Moving objects refers to any object of a scene which is changing its location across a plurality of images captured. Thus, for the object to be identified as the moving object, the object should be in motion in a majority of the plurality of images captured. However, the motions such as an oscillatory motion or clutter noise due to the motion of objects that do not change their locations are not identified as moving objects. For example, the unwanted objects in the scene can be described as the moving objects.

Temporally close images refers to the plurality of images captured successively over a predefined time interval. For example, a burst mode capture providing 5-6 images captured with a time span of 300-400 milliseconds between each capture.

The various embodiments disclosed herein achieve a method and device for composing an image by eliminating one or more moving objects in a base image selected from a plurality of images captured by an image capturing device.

The method includes enabling an image capturing device to capture temporally close plurality of images of a scene of interest. In an embodiment, the method includes aligning a plurality of captured images using existing image alignment techniques to compensate for translational, rotational and similar variations among the plurality of captured images. These variations may occur due to changes in camera angle, camera positions while the plurality of images is being captured by the image capturing device.

In an embodiment, the method enables generating a background image from the plurality of aligned images, where the generated background image is a composite of the aligned images. The background image provides a reference image which includes stationary objects of the scene of interest that is being captured by the image capturing device in plurality of captured images. In an embodiment, the method includes generating the background image by dividing each of the aligned images into plurality of grids or blocks. In an embodiment, the method includes calculating a local kernel histogram for all pixels of each grid of all the aligned images. In an embodiment, the method includes comparing histogram distance of each corresponding grid of the aligned images and grid with minimum histogram distance is selected as corresponding grid for background image.

In an embodiment, the method includes selecting the base image from aligned images that provides highest similarity measure with the background image.

In an embodiment of the present disclosure, an image from the plurality of aligned images such that it is possible to eliminate all the moving objects can be successfully removed is selected as the base image.

Thereafter, the method includes utilizing the background image to identify whether any moving object(s) (non-stationary) is present in the base image. In an embodiment, the method includes eliminating one or more identified moving objects from the base image.

In an embodiment of the present disclosure, the identified moving objects are automatically eliminated from the base image without user intervention.

In an embodiment of the present disclosure, the base image with the identified moving objects can be displayed to the user to receive user's confirmation before eliminating the identified moving objects.

The elimination of the identified one or more moving object includes plurality of steps. The elimination includes marking a region around each the identified one or more moving objects. In an embodiment, the elimination includes selecting an intermediate image from the remaining plurality of aligned images such that one or more regions (one or more target regions) of the intermediate image corresponding to the one or more marked regions in the base image provide best match with the corresponding one or more regions of the background image. Thereafter, elimination includes replacing one or more marked regions of the base image with the corresponding one or more regions in the intermediate image.

In an embodiment, the aligning of captured images does not limit to aligning of the marked regions in the base image with the corresponding target regions in the intermediate image. The method includes considering entire captured image while aligning the captured images and does not limit to compensating image movement of only the regions corresponding to one or more moving objects. This provides a smooth blending between the replaced target region taken from the intermediate image with the base image to provide a natural-looking composed image. Thus, the proposed method enhances the photography experience of the user.

In an embodiment of the present disclosure, the plurality of captured images can be images captured using a burst mode of the image capturing device, may originate from multiple frames of a video sequence or the like. For example, the video sequence can be from a video file or a video surveillance camera.

In an embodiment, the method includes composing the image instantaneously by eliminating identified one or more moving objects to provide a user friendly, computationally less complex and faster elimination of one or more moving objects. The method can be implemented on the image capturing device such as a digital camera, a mobile phone, a tablet, a laptop, a Personal Digital Assistant and the like. However, the method can be implemented on other electronic devices such as a desktop, a surveillance camera and the like.

In an embodiment of the present disclosure, the method disclosed can be implemented as one of camera mode of the image capturing device or can be an application on the image capturing device. However, implementation of the method can be specific to the image capturing device and need not limit to any particular way of implementation.

FIG. 1 is an illustration of modules of the image capturing device for composing the image by eliminating one or more moving objects from the base image captured by the image capturing device according to an embodiment of the present disclosure.

Referring to FIG. 1, the figure depicts an image capturing device 100 including an image capturing module 101, a processing module 102, a display module 103 and a memory module 104. The image capturing module 101 is configured to capture plurality of images of the scene of interest. The processing module 102 can be configured to align the captured images and generate the background image as a composite image of all aligned images. In an embodiment, the processing module 102 can be configured to select the base image from the aligned images and identify one or more moving objects in the base image. In an embodiment, the processing module 102 can be configured to mark the regions around the identified one or more moving objects and select the intermediate image from remaining aligned images with reference to the background image. In an embodiment, the processing module 102 can be configured to compose the image by replacing one or more marked regions in the base image with corresponding one or more regions of the intermediate image.

The display module 103 is configured to display the processed output image on a display screen of the image capturing device 100.

The memory module 104 is configured to store the captured images, the aligned images, the background image, and the image (composed image).

The display module 103 is configured to provide a User Interface (UI) to receive one or more inputs from the user such as user selection for the identified moving objects in the marked regions of the base image. For example, the user selection can be received through a touch sensitive screen in the image capturing device 100.

The description of the modules in the image capturing device 100 limits to modules relevant to the various embodiments of the present disclosure for simplicity and ease of understanding. However, the image capturing device 100 includes various other modules to support additional functionalities and operations of the image capturing device 100.

The names of the modules of the image capturing device 100 are used for illustrative purposes only and should not be considered as a limitation.

Figure 2:
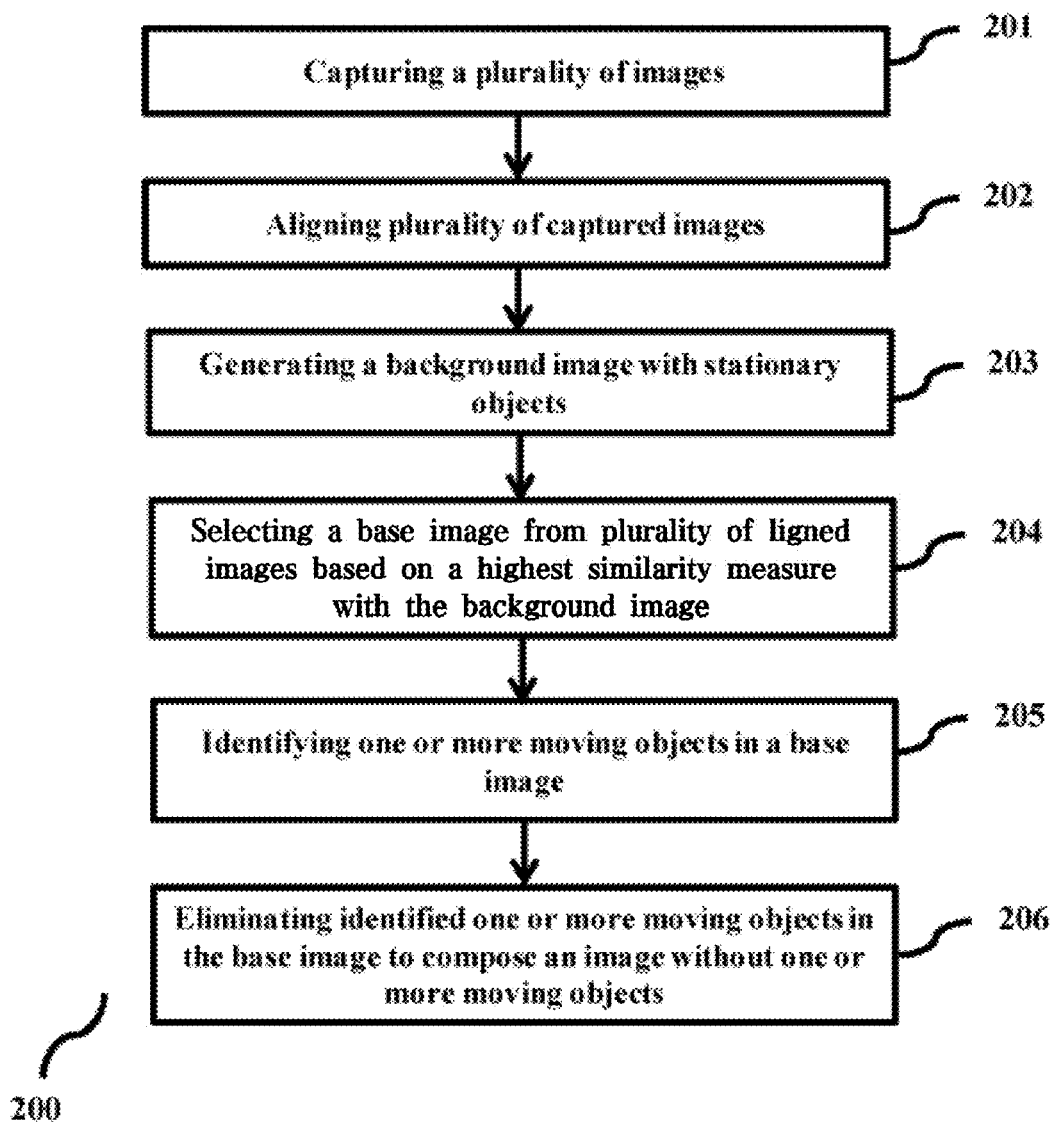
FIG. 2 is a flow diagram of a method for composing an image by eliminating one or more moving objects from a base image according to an embodiment of the present disclosure.

FIG. 2 is a flow diagram of a method for composing an image by eliminating one or more moving objects from a base image according to an embodiment of the present disclosure.

Referring to FIG. 2, at operation 201, the method 200 includes capturing a plurality of images of the scene of interest taken from same view point that are temporally close to each other.

In an embodiment of the present disclosure, the method 200 allows the image capturing module 101 to capture the plurality of images from a same view point. The plurality of images is captured without disturbing the device parameters settings such as zoom, shutter speed or the like. However, based on the default configurations in the image capturing module 101 there may be minor self-adjustment in the device parameters while capturing images in the burst mode or automatic mode of the image capturing device 100. In an embodiment, at operation 202, the method 200 includes aligning plurality of captured images (plurality of images captured by the image capturing device) to compensate for any translational or rotational shifts occurred during capturing of each of the captured images. In an embodiment, the method 200 allows the processing module 102 to align each of the captured images. The image alignment can be performed using feature matching based image registration technique, standard image alignment technique and the like.

In an embodiment of the present disclosure, the processing module 102 can be configured to perform image alignment using a feature matching based image registration technique. The captured images may have a global movement and a local movement that introduces misalignment among the plurality of images captured by the image capturing device 100. Thus, the feature matching based image registration technique provides image alignment by compensating the global movement present in the captured images. The global movement (global motion) is a misalignment in the plurality of images captured due to camera shake, field of view change in camera, oscillatory motion captured in the plurality of images and the like. The local movement (local motion) is referred to the moving objects captured in the plurality of images of the scene. (for example, moving strangers, moving vehicle) The feature matching based image registration technique described in detail in FIG. 3 enables higher accuracy in image alignment by identifying features of stationary objects in the captured images and aligning the captured images based on the identified stationary objects. The feature matching based image alignment technique provided can handle all types of local motions including large local motion.

In an embodiment, at operation 203, the method 200 includes generating a background image from the plurality of aligned images. In an embodiment of the present disclosure, the method 200 allows the processing module 102 to generate the background image from the plurality of aligned images. The background image is obtained by dividing (partitioning) each of the aligned images into a plurality of grids or blocks. For example, the processing module 102 can be configured to calculate pixels values of each grid of all the aligned images using a local kernel histogram technique or the like.

To achieve a temporal correlation between the sequences of image (aligned images) a two dimensional matrix is prepared for each non-overlapping grid; containing histogram distances between image sequences. In an embodiment, each row of the matrix is accumulated to obtain temporal correlation of each aligned image with respect to other aligned images. The generation of background image is illustrated and described in FIG. 5.

The Euclidean histogram distance of each corresponding grid of the aligned images is compared. In an embodiment, grid with minimum Euclidean histogram distance with respect to the corresponding grid from other images is selected as corresponding grid for background image being estimated. Thus, all aligned images are scanned block by block and each block from each aligned image is compared with block in other aligned images and the process repeats for all blocks in each aligned image to generate a complete background image.

The background image generation provided by the method 200 is robust against any residue image alignment errors that remain unrectified during the alignment process. The background image estimation process provided by the method 200 enables avoiding over capturing of the motion in the captured image by applying lower weightage to the global motion. This allows consideration of the global motion detected in the aligned images as stationary element (stationary objects) of the aligned images.

Thus, the estimated background image represents the static scene captured in images. The background image itself is not sufficient to provide as the composed output image free from moving objects due to presence of noise present in the background image.

However, comparison of the base image with background image enables identification of all the moving objects in the captured scene. In an embodiment, if the user desires to remove only selected moving objects from the captured images the identified moving objects can be removed selectively.

The background image generation that utilizes localized kernel histogram enables compensating for the misalignment in captured images due to localized motion such as clutter noise, oscillatory motion by nullifying the localized motion. For example, as motion in leaves of tree, a flag waving, movement of clouds is identified as localized motion.

In an embodiment, at operation 204, the method 200 includes selecting the base image from the aligned images. In an embodiment of the present disclosure, the method 200 allows the processing module 102 to select the base image from the aligned images. Selecting the base image includes deriving a similarity measure between the aligned images and the background image to choose one aligned image which is spatially closest to the background image or is most identical to the background image. The closeness between the background image and each of the aligned images is detected based on computation of a similarity measure. The selection of base image is described in detail in FIG. 4.

In an embodiment, at operation 205, the method 200 includes identifying one or more moving objects in a base image. The method 200 allows the processing module 102 to identify any moving objects in the selected base image by processing the base image and the background image. The processing module 102 can be configured to perform background subtraction on the base image by subtracting the background image from base image, further performing image thresholding on the resultant subtracted image to obtain a binarized image or edge image of the base image.

In an embodiment, the method 200 includes eliminating noise in the binarized image that provides precise edges of the one or more moving objects to identify the moving objects in the base image.

Upon extracting the precise boundary of one or more moving objects and identifying the object, then at operation 206, the method 200 includes eliminating the identified one or more moving objects in the base image to compose the image without one or more moving objects. In an embodiment of the present disclosure, the method 200 allows the processing module 102 to eliminate identified one or more moving objects in the base image to compose the image without one or more moving objects. The elimination of the identified one or more moving object includes plurality of steps. The elimination includes marking a region around each the identified one or more moving objects. In an embodiment, the elimination includes selecting an intermediate image from the remaining plurality of aligned images such that the one or more regions of intermediate image (one or more target regions) corresponding to the one or more marked regions in the base image provide best match with the corresponding one or more regions of the background image. Thereafter, elimination includes replacing one or more marked regions of the base image with the corresponding one or more regions in the intermediate image.

In an embodiment of the present disclosure, one or more regions to be replaced can be selected from one or more identified intermediate images.

Figure 5:
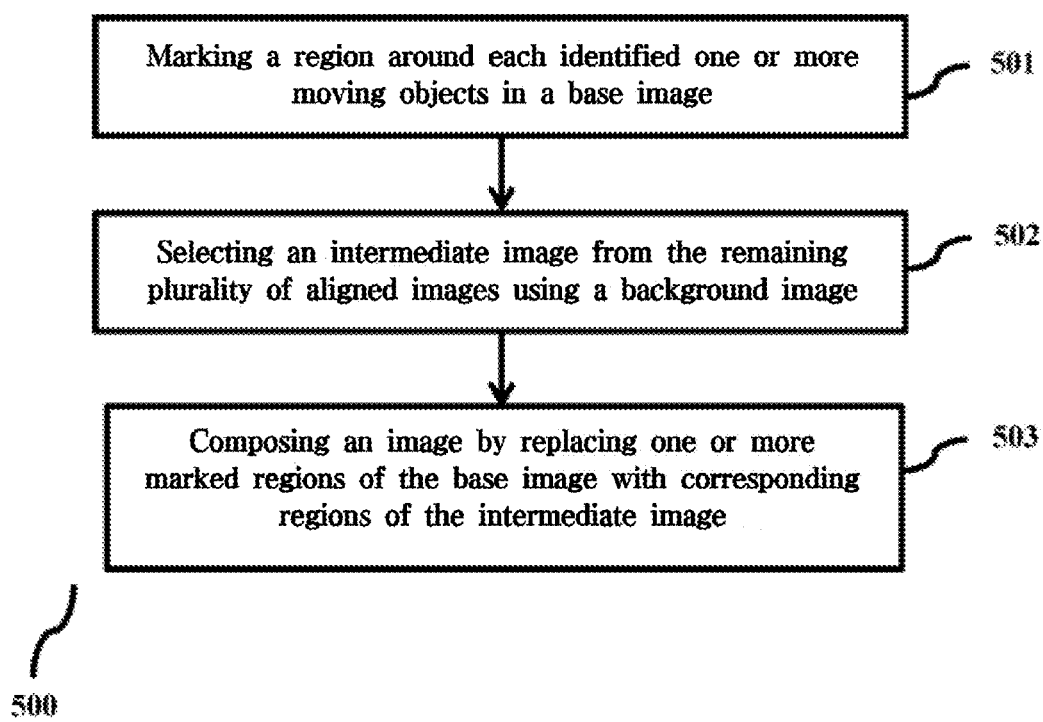
FIG. 5 is a flow diagram illustrating a method for eliminating one or more moving objects from a base image according to an embodiment of the present disclosure.

The elimination step is further described in detail in FIG. 5. The various actions, acts, blocks, steps, and the like in method 200 may be performed in the order presented, in a different order or simultaneously. In an embodiment, in various embodiments of the present disclosure, some actions, acts, blocks, steps, and the like may be omitted, added, modified, skipped, and the like without departing from the scope of the present disclosure.

In an embodiment of the present disclosure, to improve the processing speed the entire set of plurality of captured images is down sampled, thus reducing the size of images being processed. In an embodiment processing on the down sampled plurality of images such as image registration, the background image selection, base image selection, identification of one or more moving objects in the base image, the intermediate image selection and marking region around each identified moving object is performed on the down sampled images.

However, once the boundary or contour is marked around the identified moving object, the contour is up sampled. This up sampled contour is then mapped onto original size base image and original size intermediate image. In an embodiment, elimination of the identified moving object from the original size base image to provide the composed image includes replacing one or more marked regions of the original size base image with the corresponding one or more regions in the original size intermediate image.

Thus, the method 200 provides higher processing speed using the down sampling technique. However, the method maintains the resolution and quality of composed image displayed to the user by one or more marked regions of the original size base image with the corresponding one or more regions in the original size intermediate image.

Figure 3:
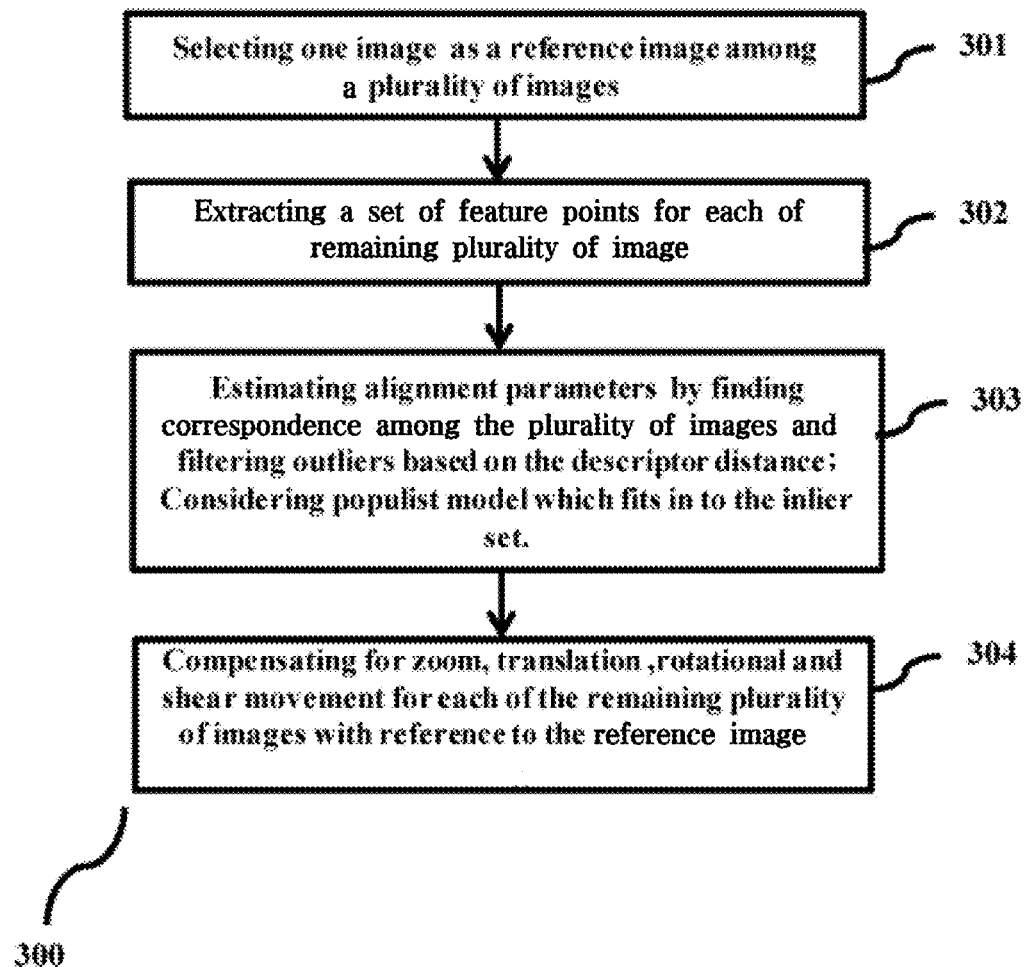
FIG. 3 is a flow diagram of a method for image registration of a plurality of images captured by an image capturing device according to an embodiment of the present disclosure.

FIG. 3 is a flow diagram of a method for image registration of the plurality of images captured by an image capturing device according to an embodiment of the present disclosure.

Referring to FIG. 3, the image registration is performed to compensate the global motion occurred during the capture of images in burst shot mode or during time lapse photography.

At operation 301, the method 300 includes selecting one image as a reference image from a plurality of images captured by the image capturing device 100. In an embodiment, the method 300 allows the processing module 102 to select one image as a reference image from plurality of images captured by the image capturing device 100. In an embodiment, at operation 302, the method 300 includes extracting a set of feature points for each of remaining plurality of images. In an embodiment of the present disclosure, the method 300 allows the processing module 102 to extract the set of feature points for each of the remaining plurality of images. In an embodiment, at operation 303, the method 300 allows estimating alignment parameters by correspondence and filtering out any outliers based on the descriptor distance. In an embodiment, the method 300 allows considering the populist model which fits in to the inlier set. In an embodiment of the present disclosure, the method 300 allows the processor module 102 to estimate alignment parameters by correspondence and filter out any outliers based on the descriptor distance. In an embodiment, the method 300 allows the processing module to consider the populist model which fits in to the inlier set. In an embodiment, at operation 304, the method 300 includes compensating for zoom, translation, rotational and shear movement of the remaining images with reference to the reference image. In an embodiment of the present disclosure, the method 300 allows the processing module 102 to compensate for zoom, translation, rotational and shear movement of the remaining images with reference to the reference image. The various actions, acts, blocks, steps, and the like in method 300 may be performed in the order presented, in a different order or simultaneously. Further, in various embodiments of the present disclosure, some actions, acts, blocks, steps, and the like may be omitted, added, modified, skipped, and the like without departing from the scope of the present disclosure.

Figure 4:
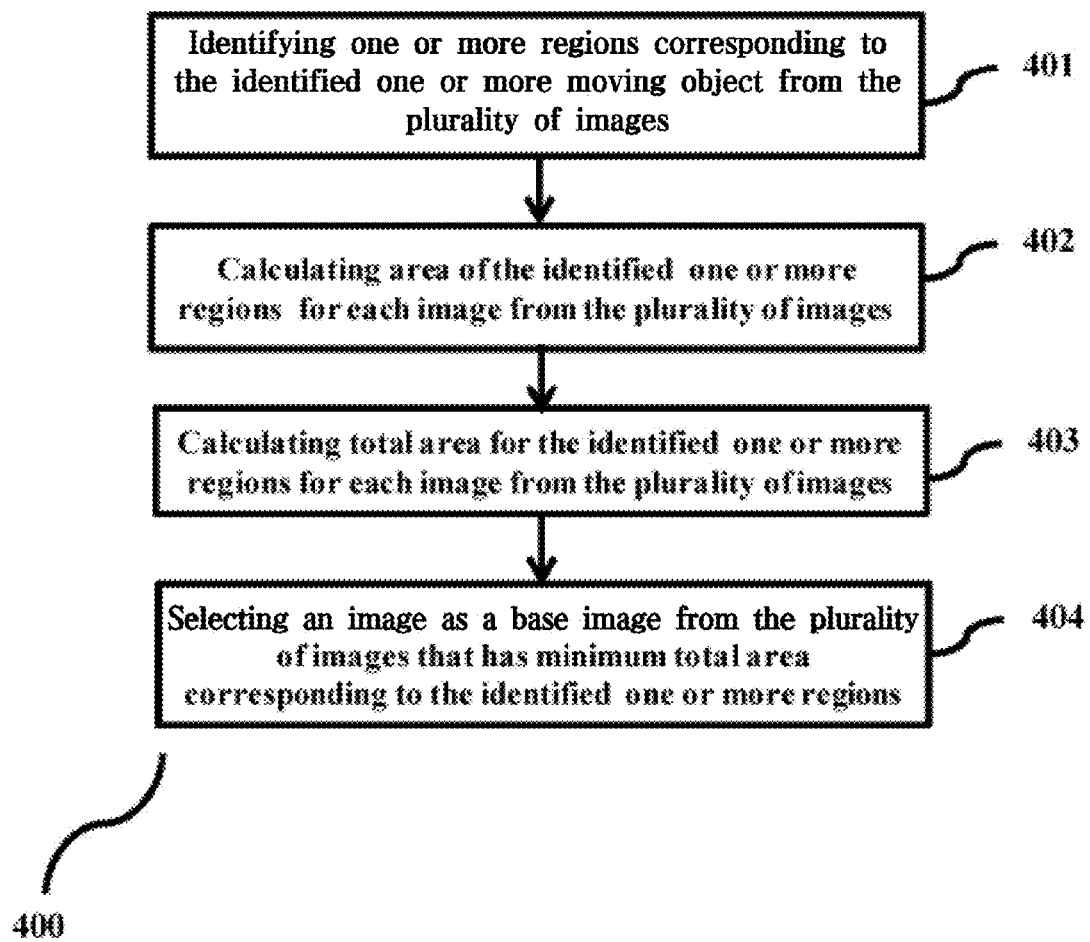
FIG. 4 is a flow diagram of a method for selecting a base image according to an embodiment of the present disclosure.

FIG. 4 is a flow diagram of a method for selecting a base image according to an embodiment of the present disclosure.

Referring to FIG. 4, the similarity measure used to select the base image from plurality of images as mentioned at operation 204 of FIG. 2 comprises identifying one or more moving objects in each image from the set of plurality of images. The identification of moving object is performed using similar procedure as described at operation 205 which is used to identify moving objects in the selected base image.

At operation 401, the method 400 includes identifying one or more regions corresponding to the identified one or more moving object from the plurality of images. In an embodiment of the present disclosure, the method 400 allows the processing module 102 to identify one or more regions corresponding to the identified one or more moving object for each image from the plurality of images. Further, at operation 402, the method 400 includes calculating area of the identified one or more regions for each image. In an embodiment of the present disclosure, the method 400 allows the processing module 102 to calculate area of the identified one or more regions for each image from the plurality of images. In an embodiment, at operation 403, the method 400 includes calculating total area for the identified one or more regions for each image from the plurality of images. In an embodiment of the present disclosure, the method 400 allows the processing module 102 to calculate total area for the identified one or more regions for each image from the plurality of images. In an embodiment, at operation 404, the method 400 includes selecting an image as a base image from plurality of images that has minimum total area corresponding to the identified one or more regions. In an embodiment of the present disclosure, the method 400 allows the processing module 102 to select the image as base image from plurality of images that has minimum total area corresponding to the identified one or more regions. The various actions, acts, blocks, steps, and the like in method 400 may be performed in the order presented, in a different order or simultaneously. Further, in various embodiments of the present disclosure, some actions, acts, blocks, steps, and the like may be omitted, added, modified, skipped, and the like without departing from the scope of the present disclosure.

FIG. 5 is a flow diagram illustrating a method for eliminating one or more moving objects from a base image according to an embodiment of the present disclosure.

Referring to FIG. 5, as described in FIG. 2, upon identifying one or more moving objects in the base image, at operation 501, the method 500 includes marking a region around each identified one or more moving object. In an embodiment of the present disclosure, the method 500 allows the processing module 102 to mark the identified one or more moving objects based on the extracted boundary of the marked region. The marking step includes finding contours of identified one or more moving objects and creating a bounding box containing the one or more moving objects.

In an embodiment of the present disclosure, when the image capturing device 100 is in automatic mode, the marked region on the base image is further processed without any user intervention to provide the composed image without the identified one or more moving objects.

In an interactive mode of the image capturing device 100, one or more identified moving objects can be displayed to the user to receive user's confirmation for elimination of the marked region. For example, the marked region can be represented by means of a dotted contour along the boundary of the identified object, an oval, a rectangular box around the marked region or a highlighted display around the mark region or the like. The user can then select one or all the marked regions to be deleted from the output processed image. Only the user selected moving objects are deleted from the output processed image.

The method 500 allows the processing module 102 to process identified steady moving pattern in the base image as the stationary object. Generally such steady moving pattern is an element of the scene to be captured. For example, a moving train in the background is not identified as the moving object with reference to the scene being captured. Moreover general prediction enables estimating such steady pattern as element of the background image.

In an embodiment, at operation 502, the method 500 includes selecting the intermediate image from the remaining plurality of aligned images that are left after selection of the base image. In an embodiment of the present disclosure, the method 500 allows the processing module 102 to select the intermediate image from the remaining aligned images such that the region of intermediate image (target region) corresponding to the marked region in the base image provides a best match or highest similarity measure with the corresponding region of the estimated background image.

Thereafter, at operation 503, the method 500 includes composing an image by replacing one or more marked regions of the base image with the corresponding one or more regions in the intermediate image. In an embodiment of the present disclosure, the method 500 allows the processing module 102 to compose the image by replacing one or more marked regions of the base image with the corresponding one or more regions in the intermediate image. The replacing step eliminates the identified one or more moving objects in the base image and replacing them with a stationary scene.

The various actions, acts, blocks, steps, and the like in method 500 may be performed in the order presented, in a different order or simultaneously. Further, in various embodiments of the present disclosure, some actions, acts, blocks, steps, and the like may be omitted, added, modified, skipped, and the like without departing from the scope of the present disclosure.

Figure 6A:
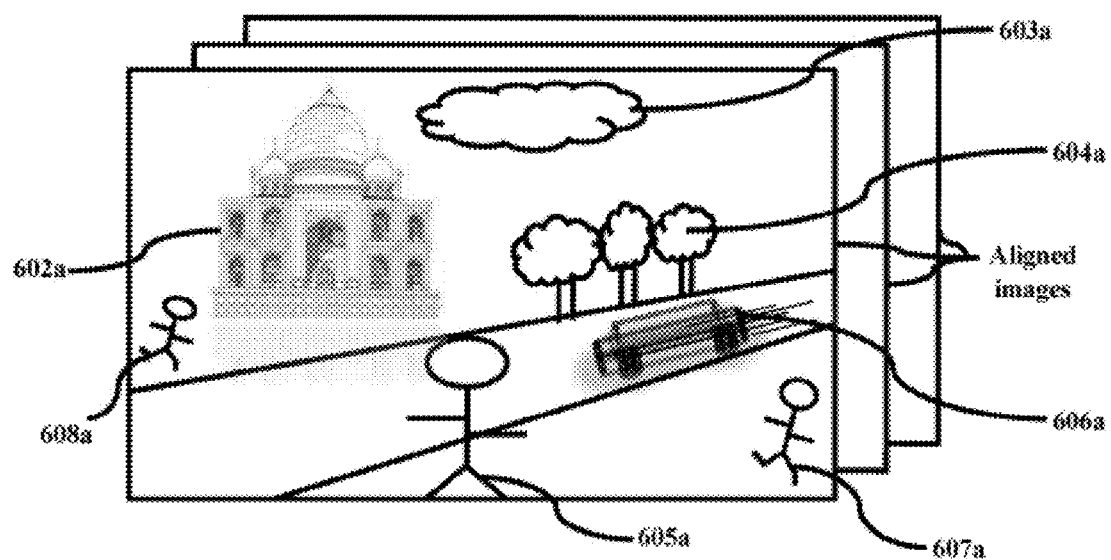
FIGS. 6A, 6B, and 6C are illustrations of a plurality of aligned images including a base image with one or more identified moving objects and a composed image, according to various embodiments of the present disclosure.
Figure 6B:
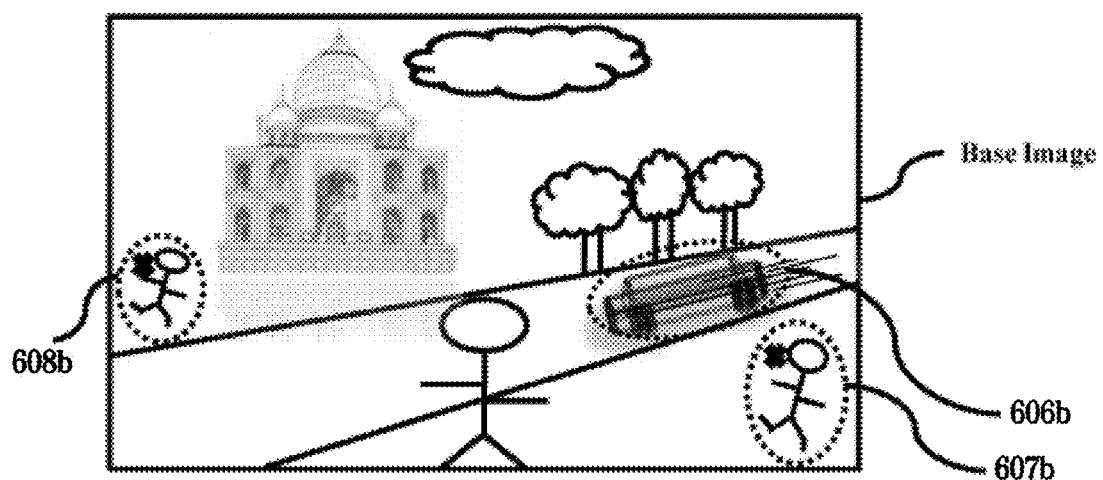
Figure 6C:
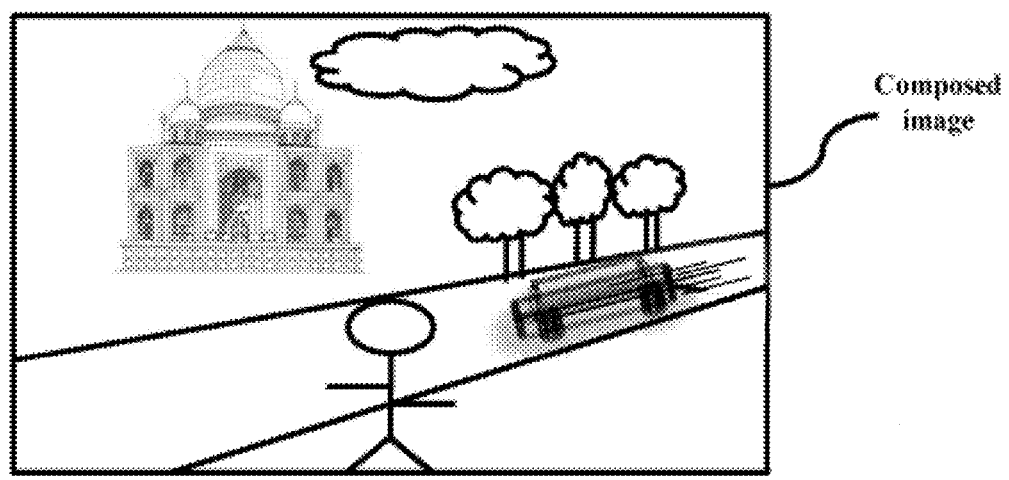

FIGS. 6A, 6B, and 6C are illustrations of a plurality of aligned images including a base image with one or more identified moving objects and a composed image according to various embodiments of the present disclosure.

Referring to FIG. 6A, the figure depicts a scene of the monument being captured by the image capturing device 100. The image capturing device 100 in the burst mode captures a plurality of images of the scene of interest with each captured image temporally closer to each other. Further, the captured images are aligned and stored in the memory module 103. The aligned images include stationary objects such as a monument 602a, a cloud 603a, trees 604a, a person 605a intentionally posing for the shot captured by the image capturing device along with moving objects such as a car 606a, a stranger 607a and a stranger 608a. The method allows the processing module 102 to mark the region around the moving object after identifying them using the background image as reference.

Referring to FIG. 6B, the figure depicts a base image that displays the marked regions of the identified moving objects 606b, 607b, and 608b respectively with an enclosed dotted contour along with the stationary objects of the scene as described in FIG. 6A.

For example, if the method is implemented in the interactive mode, the user can select stranger 607b and 608b respectively for deletion. The objects selected by the user and to be eliminated are depicted by a cross symbol in FIG. 6B as the user may wish to retain the speeding moving car 606b as element of the scene captured.

Referring to FIG. 6C, the figure depicts a composed image displayed to the user without the moving objects.

However, in an automatic mode all identified moving objects are deleted by the processing module 102 to provide the composed image.

Figure 7:
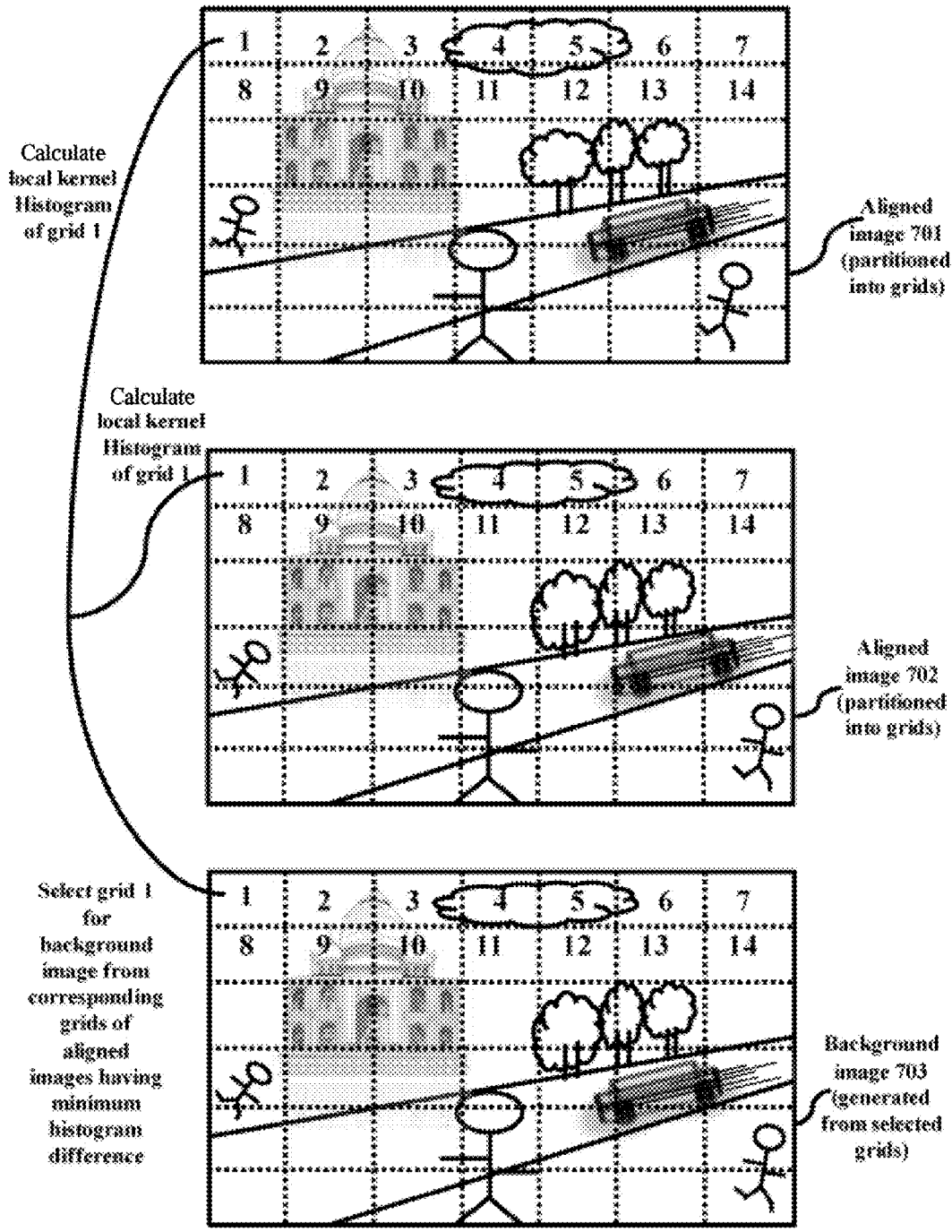
FIG. 7 is an illustration of a background image generated from a plurality of aligned images according to an embodiment of the present disclosure.

FIG. 7 is an illustration of a background image generated from a plurality of aligned images according to an embodiment of the present disclosure.

The figure depicts aligned images 701 and 702 respectively each partitioned into a plurality of grids or blocks. The local kernel histogram is calculated for pixels of each grid of the aligned images 701 and 702 respectively. For example, grid 1 depicted in figure is taken as a reference to explain the details as below.

Histogram distances of each corresponding grid 1 of the aligned images are compared and grid with minimum histogram distance is selected as corresponding grid 1 for a background image 703 being generated. Thus, the aligned images 701 and 702 are scanned block by block and each block or grid from each image is compared with corresponding block in other aligned image to select a corresponding block or grid for the background image 703. The process repeats for all blocks of each aligned image to generate complete background image 703.

Figure 8A:
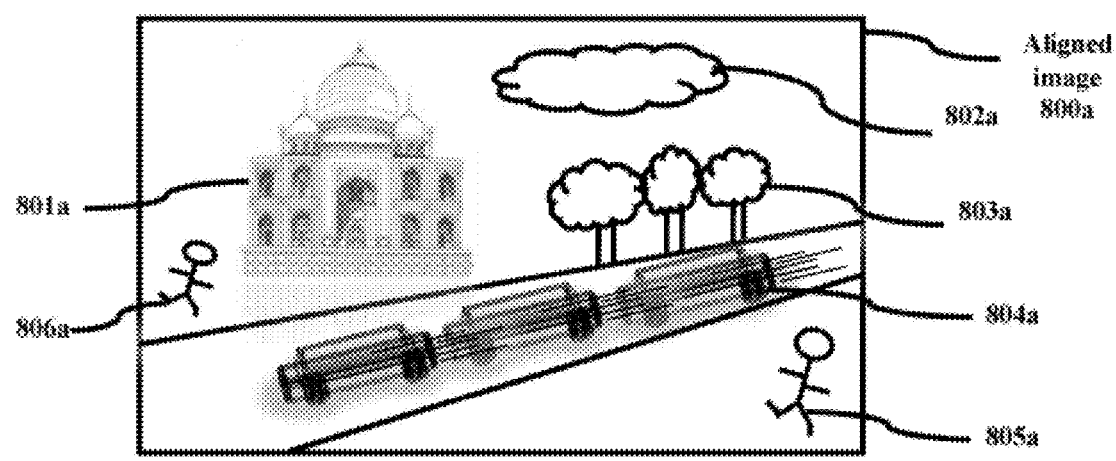
FIGS. 8A, 8B, and 8C are illustrations of a plurality of aligned images and a base image with one or more identified moving objects according to various embodiments of the present disclosure.
Figure 8B:
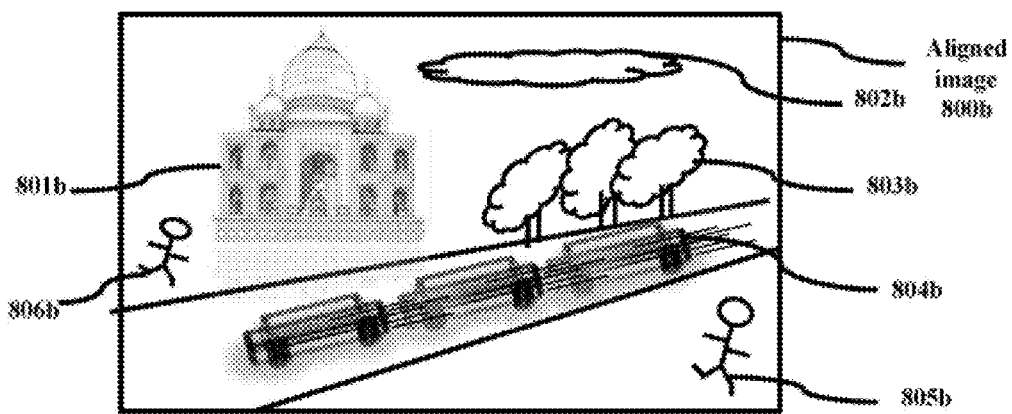
Figure 8C:
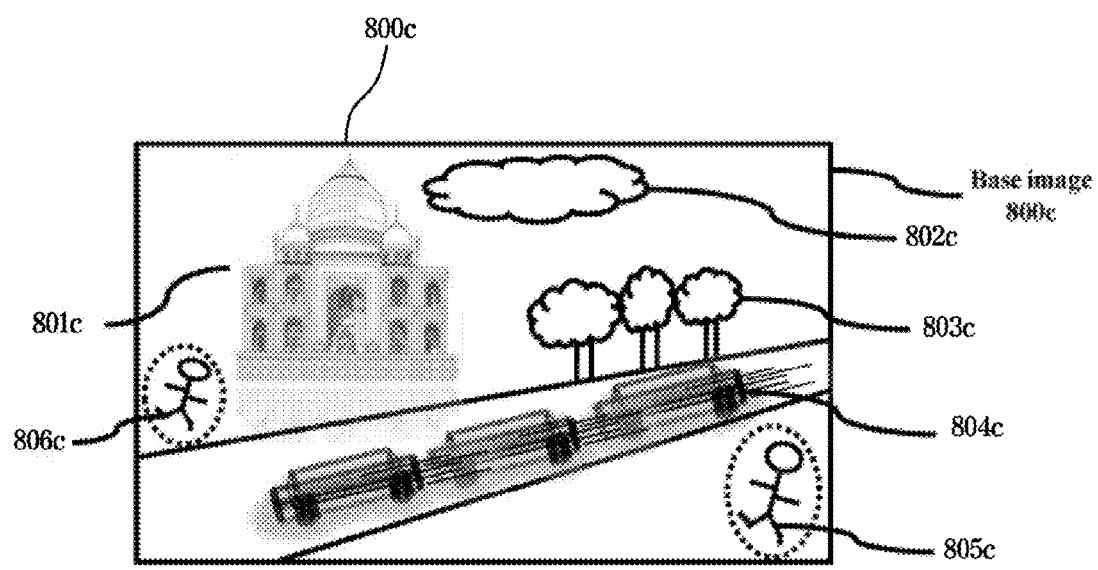

FIGS. 8A, 8B, and 8C are illustrations of a plurality of aligned images and a base image with one or more identified moving objects according to various embodiments of the present disclosure.

Referring to FIGS. 8A and 8B, the figures depict two aligned images 800a and 800b with slight movement detected in a cloud 802a/802b and trees 803a/803b as may be a case due to presence of wind. FIGS. 8A and 8B also depict the stationary object, such as the monument 801a/801b, a steady moving traffic 804a/804b, and strangers 805a/805b and 806a/806b, respectively, running across the scene. FIG. 8C depicts a displayed base image 800c that identifies only the strangers 805c and 806c respectively as moving objects, while the global movement of objects in the scene such as the cloud 802c, trees 803c and steady continuous movement of the traffic 804c are considered to be stationary elements or objects of the base image. Monument 801c is also stationary.

Figure 9:
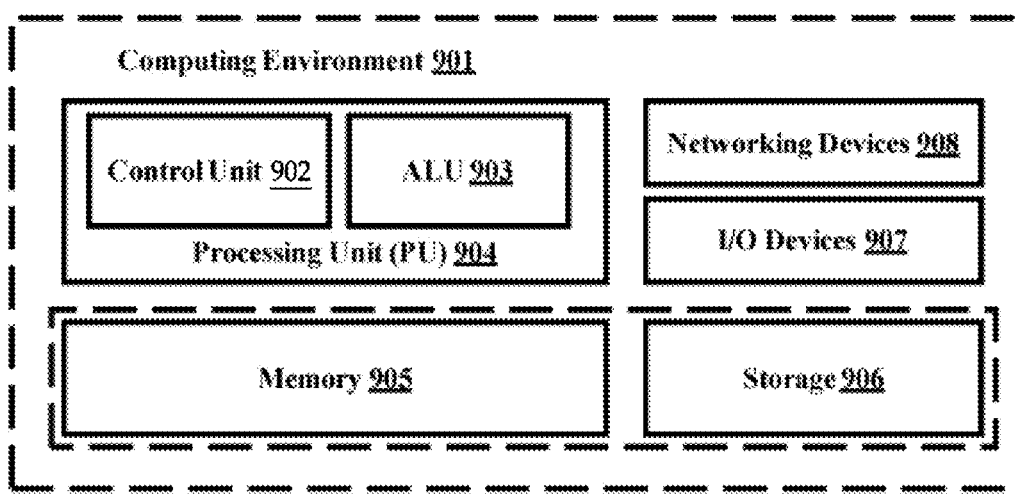
FIG. 9 illustrates a computing environment implementing a method and a device for composing an image by eliminating one or more moving objects in a base image according to an embodiment of the present disclosure.

FIG. 9 illustrates a computing environment implementing a method and a device for composing an image by eliminating one or more moving objects in a base image according to an embodiment of the present disclosure.

Referring to FIG. 9, the computing environment 901 comprises at least one processing unit 904 that is equipped with a control unit 902 and an Arithmetic Logic Unit (ALU) 903, a memory 905, a storage unit 906, plurality of networking devices 908 and a plurality of input output (I/O) devices 907. The processing unit 904 is responsible for processing the instructions of the algorithm. The processing unit 904 receives commands from the control unit 902 in order to perform its processing. In an embodiment, any logical and arithmetic operations involved in the execution of the instructions are computed with the help of the ALU 903.

The overall computing environment 901 can be composed of multiple homogeneous and/or heterogeneous cores, multiple central processing units (CPUs) of different kinds, special media and other accelerators. The processing unit 904 is responsible for processing the instructions of the algorithm. In an embodiment, the plurality of processing units 904 may be located on a single chip or over multiple chips.

The algorithm comprising of instructions and codes required for the implementation are stored in either the memory unit 905 or the storage 906 or both. At the time of execution, the instructions may be fetched from the corresponding memory 905 and/or storage 906, and executed by the processing unit 904.

In case of any hardware implementations various networking devices 908 or external I/O devices 907 may be connected to the computing environment 901 to support the implementation through the networking devices 908 and the I/O device 907.

Various embodiments of the present disclosure have been explained considering input image, output image, intermediate image and base image; however, it may be obvious to a person of ordinary skill in the art that the various embodiments as disclosed herein may be extended to input multimedia, output multimedia, intermediate multimedia and base multimedia.

The various embodiments of the present disclosure can be implemented through at least one software program running on at least one hardware device and performing network management functions to control the elements. The elements shown in FIGS. 1 and 4 include blocks which can be at least one of a hardware device, or a combination of hardware device and software module.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of composing an image, the method comprising:
   capturing a plurality of images;
   generating a background image with a plurality of stationary objects after aligning the plurality of captured images;
   selecting a base image from a plurality of aligned images, the base image being selected based on a highest similarity measure with the background image;
   identifying the at least one moving object in the base image;
   eliminating the identified at least one moving object from the base image; and
   composing the base image so that the at least one moving object is eliminated from at least one target region,
   wherein the at least one target region is selected from remaining images of the plurality of aligned images based on a highest similarity measure with a corresponding at least one region of the background image, and
   wherein the at least one target region corresponds to the eliminated at least one moving object.

2. The method of claim 1, wherein the generating of the background image comprises:
   partitioning each of the plurality of aligned images into a plurality of grids; and
   computing a local kernel histogram for the each grid in the each of the aligned images.

3. The method of claim 2, wherein the generating of the background image further comprises:
   selecting grids among the plurality of grids for generating the background image,
   wherein each grid among the selected grids is selected from a set of corresponding grids of the plurality of aligned images based on a least a histogram distance.

4. The method of claim 1,
   wherein the eliminating of the identified at least one moving object from the base image comprises marking at least one region around each of the identified at least one moving object in the base image,
   wherein the at least one target region corresponds to the at least one marked region of the base image, and
   wherein the composing of the base image comprises:
   selecting the at least one target region from the remaining images by comparing a similarity measure between at least one target region in each of the remaining images with a corresponding at least one region in the background image; and
   replacing the at least one marked region of the base image with the selected at least one target region.

5. The method of claim 4, wherein the marking of the at least one region comprises:
   obtaining a subtracted image by subtracting the background image from the base image;
   thresholding the subtracted image to obtain a binarized image;
   identifying the at least one moving object by detecting boundary of the at least one moving object in the binarized image; and
   determining at least one contour of the identified at least one moving object to mark the identified at least one region in the base image.

6. An image capturing device for composing an image, the image capturing device comprising:
   at least one non-transitory memory configured to store computer program code therein; and
   at least one processor being, upon execution of the computer program code, configured to:
   capture a plurality of images,
   generate a background image with a plurality of stationary objects after aligning the plurality of captured images,
   select a base image from a plurality of the aligned images, the base image being selected based on a highest similarity measure with the background image,
   identify said at least one moving object in the base image, and
   eliminate the identified at least one moving object from the base image to compose said image,
   wherein the at least one moving object is eliminated within at least one target region,
   wherein the at least one target region is selected from remaining images of the plurality of aligned images based on a highest similarity measure with a corresponding at least one region of the background image, and
   wherein the at least one target region corresponds to the eliminated at least one moving object.

7. The image capturing device of claim 6, wherein the at least one processor is configured to generate the background image by:
  partitioning each of the plurality of aligned images into a plurality of grids, and
  computing a local kernel histogram for each the grid in each of the aligned images.

8. The image capturing device of claim 7, wherein the at least one processor is further is configured to generate the background image by:
  selecting grids among the plurality of grids for generating the background image,
  wherein each grid among the selected grids is selected from a set of corresponding grids of the plurality of aligned images based on a least a histogram distance.

9. The image capturing device of claim 6, wherein the at least one processor is further configured to eliminate the identified at least one moving object from the base image by:
  marking at least one region around each of the identified at least one moving object in the base image, the at least one target region corresponding to the at least one marked region of the base image,
  selecting the at least one target region from the remaining images by comparing the similarity measure between at least one target region in each of the remaining image, with a corresponding at least one region in the background image, and
  replacing the at least one marked region of the base image with the selected at least one target region.

10. The image capturing device of claim 9, wherein the at least one processor is further configured to mark the at least one of the regions by:
  obtaining a subtracted image by subtracting the background image from the base image;
  thresholding the subtracted image to obtain a binarized image;
  identifying the at least one moving object by detecting boundary of the at least one moving object in the binarized image; and
  determining at least one contour of the identified at least one moving object to mark the identified at least one region in the base image.

11. A computer program product comprising computer executable program code recorded on a computer readable non-transitory storage medium, the computer executable program code, when executed, causing actions including:
  capturing a plurality of images;
  generating a background image with a plurality of stationary objects after aligning the plurality of captured images;
  selecting a base image from a plurality of the aligned images, the base image being selected based on a highest similarity measure with the background image;
  identifying the at least one moving object in the base image;
  eliminating the identified at least one moving object from the base image; and
  composing the base image that the at least one moving object is eliminated with at least one target region,
  wherein the at least one target region is selected from remaining images of the plurality of aligned images based on a highest similarity measure with a corresponding at least one region of the background image, and
  wherein the at least one target region corresponds to the eliminated at least one moving object.

12. The computer program product of claim 11, wherein the computer executable program code, when executed, causes further actions including:
  partitioning each of the plurality of aligned images into a plurality of grids; and
  computing a local kernel histogram for the each grid in the each aligned image.

13. The computer program product of claim 12, wherein the computer executable program code, when executed, causes further actions including:
  selecting grids among the plurality of grids for generating the background image,
  wherein each grid among the selected grids is selected from a set of corresponding grids of the plurality of aligned images based on a least a histogram distance.

14. The computer program product of claim 11, wherein the computer executable program code, when executed, causes further actions including:
  marking at least one region around each of the identified at least one moving object in the base image, the at least one target region corresponding to the at least one marked region of the base image;
  selecting the at least one target region from the remaining images by comparing a similarity measure between at least one target region in each of the remaining images with a corresponding at least one region in the background image; and
  replacing the at least one marked region of the base image with the selected at least one target region.

15. The computer program product of claim 14, wherein the computer executable program code, when executed, causes further actions including:
  obtaining a subtracted image by subtracting the background image from the base image;
  thresholding the subtracted image to obtain a binarized image;
  identifying the at least one moving object by detecting boundary of the at least one moving object in the binarized image; and
  determining at least one contour of the identified at least one moving object to mark the identified at least one region in the base image.

* * * * *